May 26, 1925.  
W. R. TEMPLETON  
STEAM TRAP  
Filed May 25, 1922  
1,539,003  
3 Sheets-Sheet 1

Inventor.  
William R. Templeton  
by Heard Smith & Tennant  
Attys

May 26, 1925.  
W. R. TEMPLETON  
STEAM TRAP  
Filed May 25, 1922   3 Sheets-Sheet 2
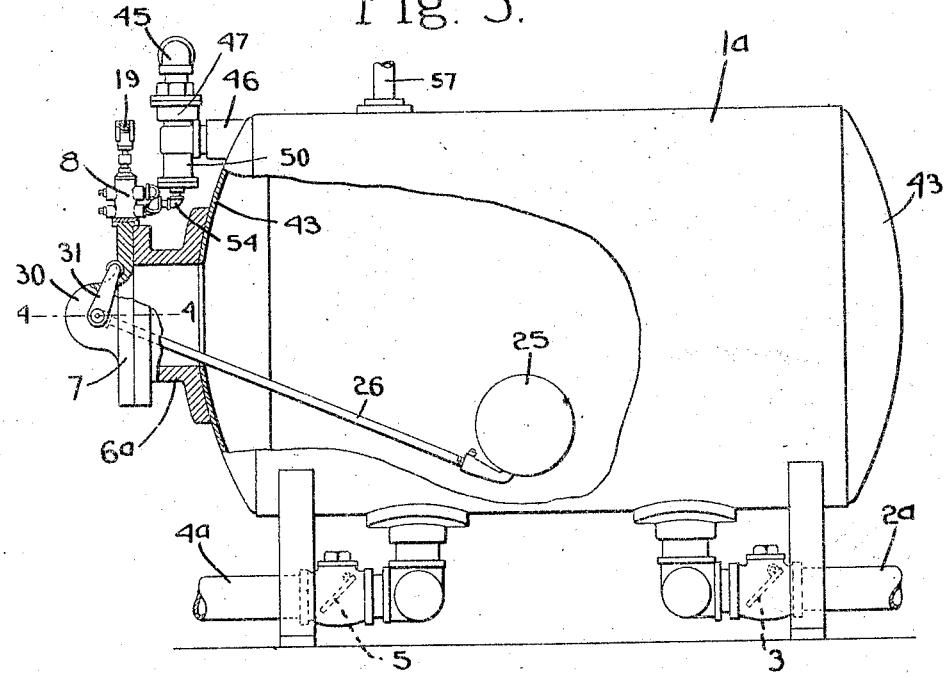
Fig. 3.
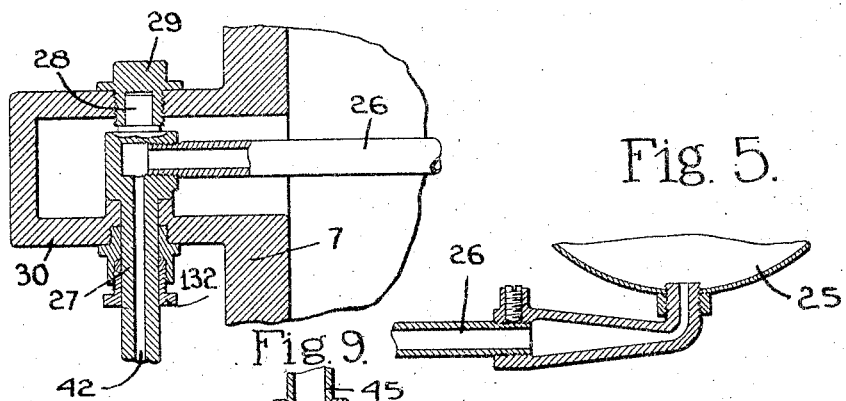
Fig. 4.
Fig. 5.
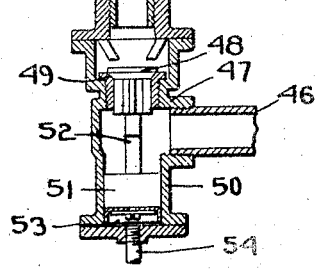
Fig. 9.
Inventor.  
William R. Templeton  
by Heard Smith & Tennant.  
Attys

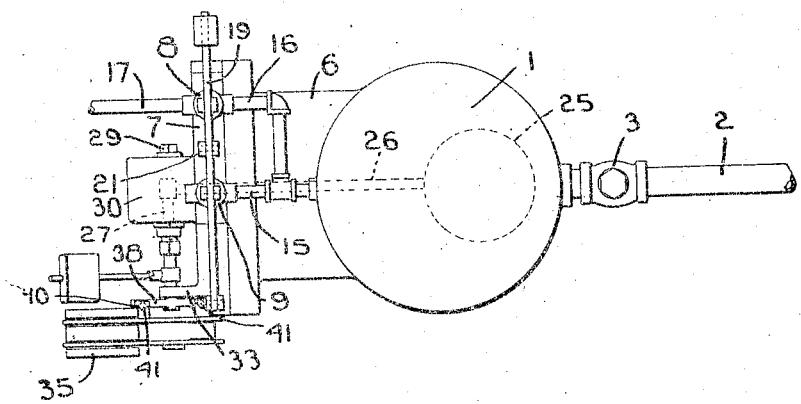
Fig. 6.
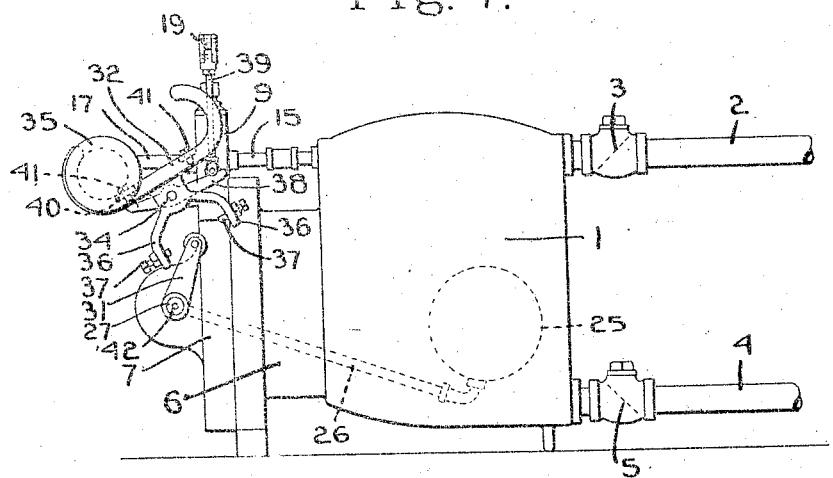
Fig. 7.
Fig. 8.
Inventor.
William R. Templeton
by Heard Smith & Tennant.
Attys Patented May 26, 1925.

1,539,003

UNITED STATES PATENT OFFICE.

WILLIAM R. TEMPLETON, OF ROSLINDALE, MASSACHUSETTS.

STEAM TRAP.

Application filed May 25, 1922. Serial No. 563,561.

*To all whom it may concern:*

Be it known that I, WILLIAM R. TEMPLETON, a citizen of the United States, and resident of Roslindale, county of Suffolk, State of Massachusetts, have invented an Improvement in Steam Traps, of which the following description, in connection with the accompanying drawing, is a specification, like characters on the drawing representing like parts.

This invention relates to steam traps such as are used for accumulating water of condensation from the steam pipes of a heating system and then delivering the water thus accumulated to a boiler or to some other receptacle.

One of the objects of the invention is to provide a novel steam trap with a simplified connection between the float arm and the valve mechanism which can be readily adjusted so that the valves will operate when the water level in the trap reaches any desired point, and which will be accurate in its operation under all adjustments.

Another object of the invention is to provide an improved trap with a self-draining float thus obviating the possibility of the float becoming water-logged, and still another object is to provide an improved construction in which the valve structure is mounted as a unit upon a head, which can be made of standard size to fit various sizes of traps, thus simplifying the manufacture thereof.

In the drawings I have illustrated some selected embodiments of the invention which will first be described after which the novel features will be pointed out in the appended claim.

Fig. 1 of the drawings is a perspective view of a steam trap constructed to handle large quantities of water.

Fig. 3 is a view showing an embodiment constructed to handle smaller quantities of water.

Fig. 4 is an enlarged section on the line 4—4, Fig. 3.

Fig. 5 is a sectional view of the float and the end of the float arm.

Fig. 6 is a plan view of still a different embodiment of the invention.

Fig. 7 is a side view of Fig. 6.

Fig. 8 is a view showing the operation of the cradle.

Fig. 9 is a sectional view through the steam valve illustrated in Figs. 1 and 3.

Figure 1:
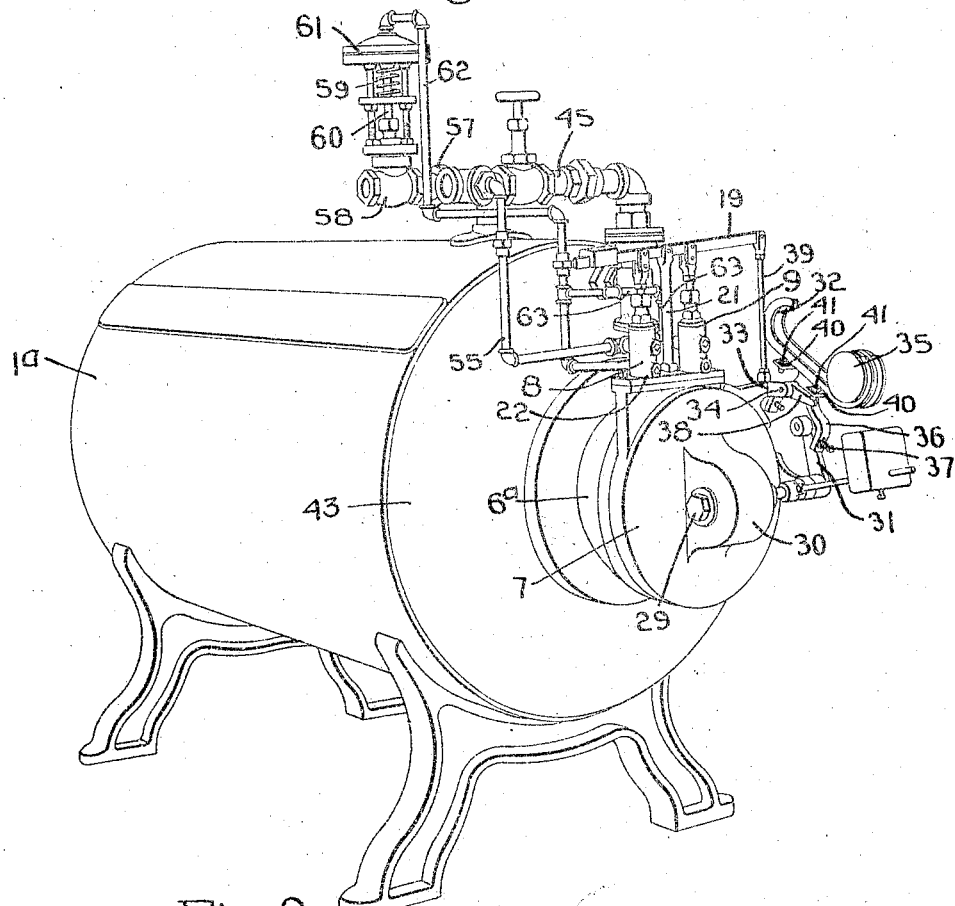

Referring first to Figs. 6 and 7, 1 indicates a casing or chamber having an inlet pipe 2 leading thereinto and through which water of condensation flows into the chamber, said pipe having an inwardly-opening check valve 3 therein, and 4 is a discharge pipe leading therefrom through which the water is delivered from the casing 1 to some other receptacle, said pipe 4 having an outwardly-opening check valve 5 therein. The chamber 1 is formed on one end with a hollow extension or neck 6 to which is secured a head 7. This head 7 constitutes the support for the float which operates within the chamber 1 and also for the controlling valves by which the operation of the device is governed.

These controlling valves comprise a steam valve and a vent valve with proper connections and arranged so that when the steam valve is closed the vent will be open while when the vent valve is closed the steam valve will be open. These valves are arranged as usual in steam traps of this type so that normally the steam valve will be closed and the vent open, the open vent allowing the air in the casing 1 to escape as the water of condensation accumulates therein. When the casing 1 is filled the float therein reverses the valves, closing the vent and opening the steam valve and the pressure of the steam forces the water from the casing 1, through the discharge pipe 4 into some receptacle which may be higher than the casing 1.

The steam valve is indicated generally at 8 and the vent valve at 9. Each valve comprises a valve casing 10 having a ported valve seat 11 which co-operates with a plunger valve 12. Each valve casing is provided with a port 13 below the valve seat which communicates with the interior of the casing 1 and each valve is also provided with a port 14 above the valve seat. The two ports 13 are shown as communicating with two pipes 15 and 16 which lead into the casing 1 and in Fig. 6 these two pipes are shown as connected so that they both communicate with the casing 1 through the same opening.

Figure 2:
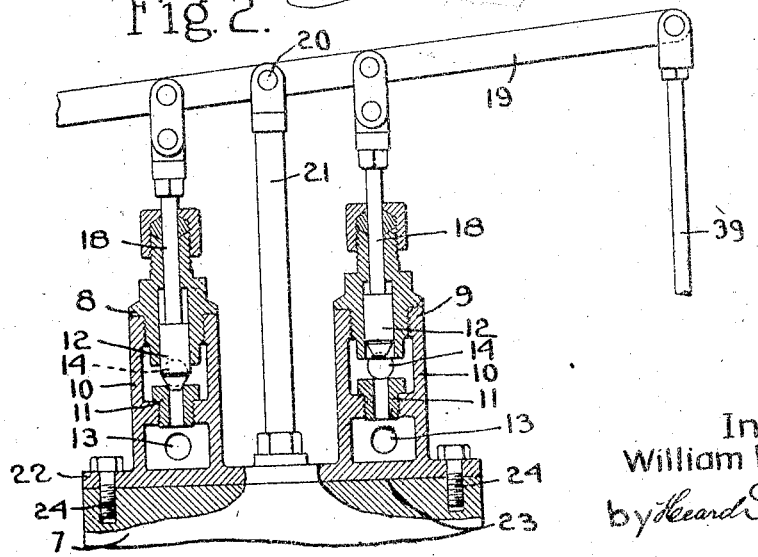
Fig. 2 is a vertical sectional view through the steam valve and vent valves.

The port 14 of the vent valve 9 leads to the atmosphere and the port 14 of the steam valve connects with a steam inlet pipe 17. Each valve has a stem 18 connected thereto and both stems are connected to an operating lever 19 which is pivoted at 20 to a standard or support 21, the arrangement being such that when the lever is turned about its pivot 20 the valves will be moved simultaneously but oppositely. When the valves are in the position shown in Fig. 2 the steam valve 8 is closed and the vent valve 9 is open so that as water flows into the casing 1 said casing will be vented through the vent valve. When the casing is filled with water the valves are reversed as usual in steam traps of this type, thus closing the vent and opening the steam valve.

In my present invention the valve casings are both formed on a base plate 22 which in turn is secured to the head 7 by means of screws 24, said head having the flat bearing surface 23 for this purpose.

The operation of the valves is controlled by a float operating in the casing 1 as usual in steam traps of this type. This float is shown at 25 and it is carried on a float arm 26 which is secured to a rock shaft 27 that is journalled in the hollow extension 30 of the head 7. One end of the rock shaft 27 is formed with a trunnion 28 which is journalled in a plug 29 screwed into one wall of the extension 30 and said rock shaft extends through the other wall of said extension and is provided at its end with an arm 31. A suitable stuffing box 132 is provided to form a tight joint.

The operative connection between the arm 31 and the valve lever 19 is of the known type which includes a rocking cradle member having a rolling weight thereon and suitable lost motion connections arranged so that as the float rises the cradle will be gradually turned from one extreme position into and past a horizontal position, said cradle arriving at the latter position just before the float reaches the upper limit of its movement. As the cradle moves by the horizontal position the weight will roll to the other end thereof thus giving a quick final movement to the cradle. The connection between the cradle and the valve structure is such that the valves receive no movement until the cradle has been carried past its horizontal position, with the result that the movement of the valve is derived from the quick final movement of the cradle.

In my present invention I have simplified this type of valve-actuated mechanism and have constructed it so that it can be readily adjusted to operate accurately when the water level in the casing is at any predetermined point.

The cradle is indicated at 32 and is pivoted at 34 to an arm 33 formed on the head 7. Said cradle has the rolling weight 35 thereon and it is provided with two separated arms 36 between which the arm 31 operates, each arm 36 having an adjustable stop screw 37 therein. Pivoted on the same pivot 34 is a rocking member 38 which is connected to the valve lever 19 by a link 39. The cradle 32 has two ears 40 extending therefrom, each of which carries an adjustable screw 41 that is adapted to engage the rocker 38. Fig. 7 shows the position of the parts when the casing 1 is empty. As the water level in the casing 1 rises the float will rise and as it rises the arm 31 will engage the stop screw 37 in the left hand arm 36 thereby turning the cradle 32 about its pivot 34. The relation between the screws 41 and the rocker arm 38 is such that there is a lost motion between the parts and further such that during this clockwise turning movement of the cradle 32 the right hand screw 41 will not engage the arm 38 until the cradle has been brought into and just by the horizontal position as shown in Fig. 8. As soon as the cradle reaches this position the weight 35 will roll to the right hand end of the cradle thus giving the latter a quick movement, and during this quick movement the right hand screw 41 engages the rocker 38 thereby operating the valves so as to close the vent valve 9 and open the steam valve 8. This added final movement of the cradle is permitted because of the lost motion between the arms 36 and the arm 31. As soon as the valves are reversed steam under pressure is admitted to the casing 1 and as the vent is closed the steam pressure will force the water out of the casing 1 into the boiler or other receptacle. As the water level in the casing 1 falls the float 25 will assume the position shown in Fig. 7, and as the float approaches its lower position the arm 31 engages the right hand arm 36 of the cradle thereby returning the cradle to and slightly past its horizontal position. The cradle will reach the horizontal position just before the float reaches its lowest position and just after the cradle comes into the horizontal position the left hand screw 41 will engage the rocker arm 38. As soon as the cradle has been turned past the horizontal position the weight 35 will roll to the left hand end of the cradle thus giving the latter a quick movement which will operate to reverse the valves. By proper adjustment of the screws 37 and 41 it is possible to adjust the valves so that the cradle will trip when the float reaches any predetermined height and this can be done without in any way affecting the accuracy of the operation.

In order to prevent the float 25 from becoming water-logged in case a leak should occur in it I have adopted the following construction.

The float arm 26 is made hollow as shown in Figs. 4 and 5 and the rock shaft 27 is also provided with a duct 42 extending longitudinally thereof and communicating with the interior of the tubular arm 26. The duct 42 is open to the atmosphere. If the float should leak and water could accumulate therein then when the float is at the upper limit of its movement, such water will flow down the hollow float arm 26 and will be discharged through the duct 42. It will, therefore, be seen that I have provided a construction by which the float will be automatically drained.

It will be observed that the valve structure is compact and is made as a unit which is removably secured to the head 7, thus simplifying the structure. Furthermore by placing the valves on the head 7 it is possible to use a standard valve construction and a standard head 7 for casings of different sizes and shapes, it only being necessary to secure the head 7 with its valve structure to the casing whatever its size or shape.

In Figs. 1 and 3 I have illustrated a construction where the casing, indicated at 1ª, is cylindrical in shape and provided with bumped ends 43. In this embodiment of the invention the head 7 with the valves thereon and the float associated therewith, is secured to a neck 6ª, which is in turn secured to one of the ends 42 of the casing 1ª. The inlet pipe is indicated at 2ª and the delivery pipe at 4ª, they being arranged to communicate with the bottom of the casing 1. They are provided with the check valves 3 and 5 as in the embodiment above described.

In the embodiment shown in Figs. 1 and 3 I have employed the valves 8 and 9 as pilot valves, which in turn control larger steam and vent valves, this being a desirable construction where the casing 1ª is of extremely large size so that a considerable valve opening is required to admit the steam to the casing or to vent the latter.

In said embodiment 45 indicates the steam pipe leading to a source of steam supply and communicating with the casing 1ª through a connection 46. This pipe has a differential valve 47 therein which normally closes the steam pipe 45 but which is opened when the pilot valve 8 is opened. The valve 47 has a valve member 48 seating on a valve seat 49, said valve being normally held closed by the steam pressure in the pipe 45. The pipe 46 leading into the casing 1ª is below the valve seat 49. In the lower end of the valve 47 is a cylinder 50 in which operates a piston 51 having a pin 52 extending therefrom which is adapted to engage the valve 48 and lift it off its seat. The space 53 beneath the piston 51 is connected to the port 13 of the valve 8, by means of a suitable pipe 54. The port 14 of said valve is connected with the steam pipe 45 by a pipe 55. When, therefore, the valve 8 is opened steam from the supply pipe 45 will be admitted to the cylinder 53 thereby raising the piston 51 and opening the valve 48. This will allow steam in large quantities to enter the casing 1ª through the connection 46.

The casing 1ª has a vent pipe 57 communicating therewith which is closed by a valve indicated at 58. This valve is normally held open by a spring 59 acting on the valve stem 60. 61 is a housing containing a diaphragm connected to the valve stem 60.

62 is a steam pipe communicating with the pipe 54 so that when the pilot valve 8 is open the diaphragm 61 will be subjected to steam pressure thus closing the valve 58. The pilot vent valve 9 has a port 13 leading to the atmosphere and the port 14 communicating by a pipe 63 with the pipe 62 so that when the vent valve is opened the diaphragm chamber will be vented. When this condition exists the spring 59 will open the valve 58.

In this embodiment of the invention when the steam pilot valve 8 is closed and the vent valve 9 is open, the main steam valve 47 will also be closed by the steam pressure and the main vent valve 58 will be held open by the spring 59, thus allowing the casing 1 to be filled with water. When the casing is full and the cradle 32 is operated to reverse the valves 8 and 9, then steam will be admitted to the chamber 53 thereby opening the steam valve 48 and will also be admitted to the diaphragm chamber thus closing the vent valve 58. At the same time the vent valve 9 is closed. Steam will thus be admitted to the casing 1ª and the water will be forced out of said casing into some other receptacle, such for instance as a steam boiler. When the casing 1ª is empty the cradle will be reversed thus opening the vent valve 9 and closing the steam valve and this operation will vent not only the chamber 53 thus allowing the steam valve 48 to close but will also vent the diaphragm chamber 61 thus allowing the vent valve 58 to close.

I claim:

In a steam trap, the combination with a casing having an inlet and an outlet, of a hollow head member separate from the casing but secured to one end thereof and provided with a valve-supporting portion, a rock shaft journalled in the head member, a float arm rigid with the rock shaft and having a float thereon operating in the casing, a unitary valve device removably secured to said valve-supporting portion and comprising a base resting on the valve-supporting portion and two separate valve casings rising from the base, a steam valve in one valve casing controlling the admission of steam to the first-named casing, a vent valve in the other valve casing for venting the first-named casing, a post rising from the base between the valve casings, a lever pivoted to said post, a connection between said lever and each valve, whereby the valves operate simultaneously but oppositely, and means for operating said lever by the movement of the float.

In testimony whereof, I have signed my name to this specification.

WILLIAM R. TEMPLETON.